United States Patent
Goetz et al.

(10) Patent No.: US 9,170,825 B2
(45) Date of Patent: Oct. 27, 2015

(54) INTERFACE METHOD RESOLUTION FOR VIRTUAL EXTENSION METHODS

(75) Inventors: Brian Goetz, Williston, VT (US); Alexander R. Buckley, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 299 days.

(21) Appl. No.: 13/092,002

(22) Filed: Apr. 21, 2011

(65) Prior Publication Data
US 2012/0272214 A1 Oct. 25, 2012

(51) Int. Cl.
G06F 9/44 (2006.01)

(52) U.S. Cl.
CPC ..................... G06F 9/443 (2013.01)

(58) Field of Classification Search
CPC .......................................... G06F 9/44
USPC ................. 717/120, 121, 122, 151, 153
See application file for complete search history.

(56) References Cited

U.S. PATENT DOCUMENTS

| | | | | |
|---|---|---|---|---|
| 5,361,350 A * | 11/1994 | Conner et al. | | 1/1 |
| 5,822,587 A * | 10/1998 | McDonald et al. | | 717/108 |
| 5,913,064 A * | 6/1999 | Chen | | 717/108 |
| 2002/0010909 A1* | 1/2002 | Charisius et al. | | 717/2 |
| 2002/0046395 A1* | 4/2002 | Briggs | | 717/116 |
| 2002/0170033 A1* | 11/2002 | Chen | | 717/124 |
| 2004/0006765 A1* | 1/2004 | Goldman | | 717/116 |
| 2004/0040029 A1* | 2/2004 | Debbabi et al. | | 719/315 |
| 2006/0184915 A1* | 8/2006 | DeGroote et al. | | 717/106 |
| 2008/0155555 A1* | 6/2008 | Kwong | | 719/315 |
| 2008/0276227 A1* | 11/2008 | Greifeneder | | 717/130 |
| 2010/0174732 A1* | 7/2010 | Levy et al. | | 707/768 |
| 2011/0283256 A1* | 11/2011 | Gregersen et al. | | 717/108 |

OTHER PUBLICATIONS

Markus Mohnen ("Interfaces with Default Implementations in Java"), Apr. 2002.*
Judson ("Extension methods vs. inheritance"), Mar. 2, 2010.*
Benz ("Virtual Extension Methods"), Nov. 2, 2006.*
Duff ("Extension methods as default interface method implementations"), Feb. 2010.*
Pirkelbauer, Peter et al., "Open Multi-Methods for C++", GPCE 07', Oct. 1-3, 2007, pp. 123-133.
Mohnen, Markus "Interfaces with Default Implementations in Java (extended abstract)", Principles and Practice of Programming in Java 2002, pp. 35-40.

* cited by examiner

*Primary Examiner* — Chat Do
*Assistant Examiner* — Jae Jeon
(74) *Attorney, Agent, or Firm* — Park, Vaughan, Fleming & Dowler LLP; Chia-Hsin Suen

(57) ABSTRACT

The disclosed embodiments provide a system that facilitates the development and execution of a software program. During operation, the system obtains, from the software program, a method call associated with one or more interfaces containing a virtual extension method. Next, the system resolves the method call by obtaining a method implementation corresponding to the method call from at least one of an inheritance hierarchy associated with the method call and the virtual extension method.

24 Claims, 4 Drawing Sheets

INTERFACE METHOD RESOLUTION FOR VIRTUAL EXTENSION METHODS

BACKGROUND

1. Field

The present embodiments relate to method resolution in object-oriented programming languages. More specifically, the present embodiments relate to techniques for resolving method calls to virtual extension methods declared in interface types of object-oriented programming languages.

2. Related Art

Extension methods in object-oriented programming languages may possibly enable the addition of methods to an existing type without creating a new type, recompiling the existing type, and/or otherwise modifying the existing type. For example, use of extension methods within interfaces may facilitate the evolution of the interfaces without requiring the addition of method implementations corresponding to the extension methods to all classes implementing the interfaces.

However, naming conflicts may exist among extension methods and/or method implementations. For example, two different method implementations with the same method signature may be provided by a class implementing an interface and an extension method associated with the interface. In addition, such naming conflicts may not be recognized by compilers, potentially resulting in subtle, hard-to-detect bugs. For example, a receiving class may implement two interfaces containing extension methods with the same method signature. During execution, a method call with the same method signature as that of the extension methods may be resolved using an extension method from the first interface at one call site and a different extension method from the second interface at a different call site, thus causing two different method implementations to be used in resolving the same method call.

Hence, what is needed is a mechanism for consistently resolving naming conflicts associated with extension methods in programming languages.

SUMMARY

The disclosed embodiments provide a system that facilitates the development and execution of a software program. During operation, the system obtains, from the software program, a method call associated with one or more interfaces containing a virtual extension method. Next, the system resolves the method call by obtaining a method implementation corresponding to the method call from at least one of an inheritance hierarchy associated with the method call and the virtual extension method.

In some embodiments, resolving the method call by obtaining the method implementation from the inheritance hierarchy associated with the method call involves identifying a receiver class associated with the method call, and searching for the method implementation within the receiver class.

In some embodiments, if the method implementation is not found in the receiver class, resolving the method call by obtaining the method implementation from the inheritance hierarchy associated with the method call further involves searching for the method implementation within one or more superclasses associated with the receiver class.

In some embodiments, resolving the method call by obtaining the method implementation from the virtual extension method associated with the one or more interfaces involves identifying the one or more interfaces containing the virtual extension method, and obtaining the method implementation from one or more default methods specified using the virtual extension method in the one or more interfaces.

In some embodiments, obtaining the method implementation from the one or more default methods involves:
 (i) obtaining a subset of the one or more interfaces by removing less specific interfaces from the one or more interfaces;
 (ii) obtaining the one or more default methods from the subset of the one or more interfaces; and
 (iii) selecting the method implementation from the one or more default methods.

In some embodiments, resolving the method call by obtaining the method implementation corresponding to the method call from at least one of the inheritance hierarchy associated with the method call and the virtual extension method involves attempting to resolve the method call using the inheritance hierarchy, and if the method call cannot be resolved using the inheritance hierarchy, resolving the method call using the virtual extension method.

In some embodiments, the method call is resolved during at least one of invocation of the one or more interfaces and loading of a class implementing the one or more interfaces.

BRIEF DESCRIPTION OF THE FIGURES

In the figures, like reference numerals refer to the same figure elements.

DETAILED DESCRIPTION

Figure 1:
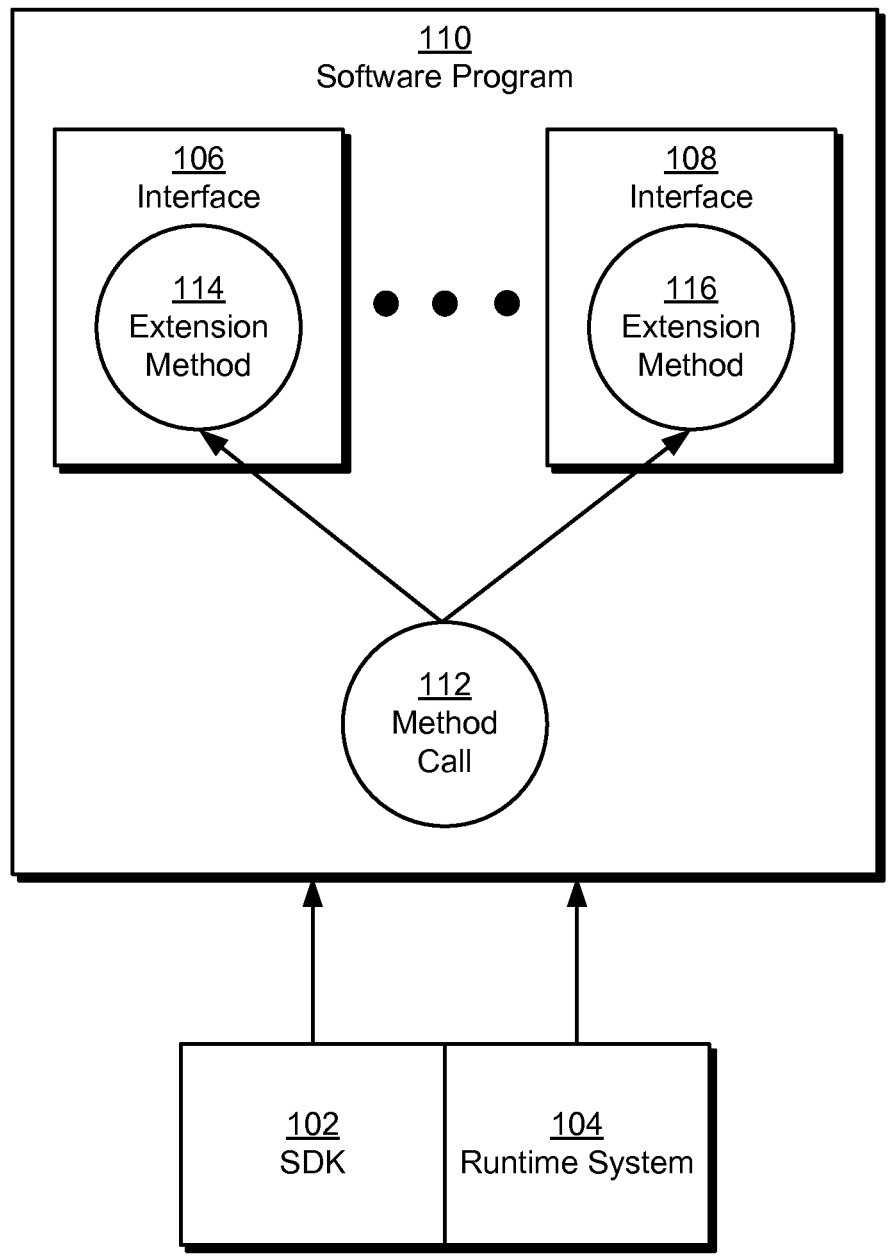
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development and execution of a software program. More specifically, the disclosed embodiments provide a method and system for resolving a method call associated with one or more interfaces used by the software program. The method call may be associated with an inheritance hierarchy containing a receiver class and/or one or more superclasses associated with the receiver class.

As a result, the method call may be resolved by obtaining, from the inheritance hierarchy, a method implementation that corresponds to (e.g., has the same method signature as) the method call. For example, resolution of the method call using the inheritance hierarchy may begin with a search for the method implementation within the receiver class. If the method implementation is not found in the receiver class, a search for the method implementation may be conducted within the superclass of the receiver class and/or other superclasses in the inheritance hierarchy until the method implementation is found and/or all classes in the inheritance hierarchy have been searched.

If the method call is not resolved using the inheritance hierarchy, the method call may be resolved using a virtual extension method that includes a method signature matching the method call and one or more default methods for the method implementation. First, interfaces containing the virtual extension method may be identified. Next, less specific interfaces may be removed from the identified interfaces to facilitate the selection of a default method that is specific to the method call. A set of possible default methods may then be obtained from the remaining interfaces, and the method implementation may be selected from the possible default methods. For example, the method implementation may be selected based on an order of implementation of the remaining interfaces by a class.

FIG. 1 shows a schematic of a system in accordance with an embodiment. As shown in FIG. 1, a software development kit (SDK) 102 and a runtime system 104 may be used to manage the development and execution of a software program 110. For example, SDK 102 and runtime system 104 may correspond to the Java (Java™ is a registered trademark of Oracle America, Inc.) Development Kit (JDK) and Java Runtime Environment (JRE).

Software program 110 may correspond to a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

Furthermore, software program 110 may include a method call 112 associated with a set of interfaces 106-108. For example, each interface 106-108 associated with method call 112 may declare a method with the same method signature as that of method call 112. Because classes that implement each interface 106-108 may be required to implement all methods declared in the interface, method call 112 may be resolved by obtaining a matching method implementation from a class within software program 110 that implements one or more interfaces 106-108.

On the other hand, classes used by software program 110 may implement versions of interfaces 106-108 that do not include method declarations corresponding to method call 112. As a result, the classes may or may not implement methods with method signatures that match method call 112. In addition, an error may be generated if method call 112 invokes a version of an interface (e.g., interfaces 106-108) that does not include a method declaration with the same method signature. The absence of method declarations that match method call 112 in interfaces 106-108 may thus hinder access to any method implementations that may be used to resolve method call 112 within software program 110.

In one or more embodiments, extension methods 114-116 that match the method signature of method call 112 may be added to interfaces 106-108 to facilitate the resolution of method call 112 using interfaces 106-108. Extension methods 114-116 may allow interfaces 106-108 to declare additional methods without requiring classes implementing interfaces 106-108 to provide method implementations corresponding to the declared methods. For example, the updating of interfaces 106-108 with extension methods 114-116 may not require the subsequent creation, recompilation, and/or modification of classes that implement interfaces 106-108.

In particular, extension methods 114-116 may facilitate source compatibility in software program 110 by specifying method implementations corresponding to method call 112 instead of requiring classes implementing interfaces 106-108 to provide the method implementations. For example, the following source code may correspond to an interface declaration containing an extension method:

```
public interface Set<T> extends Collection<T> {
    public int size( );
    extension T reduce(Reducer<T> r)
       default Collections.<T>setReducer;
}
```

Within the example, an interface named "Set" includes an extension method named "reduce" that specifies a static method located elsewhere named "Collections.<T>setReducer" as a default method implementation for the "reduce" method. Alternatively, source code for the method implementation of the "reduce" method may be included directly within the interface declaration to avert the referencing of a static method in a different location.

However, naming conflicts may exist if the method signature of method call 112 is matched by multiple extension methods 114-116 and/or method implementations in classes that implement interfaces 106-108. For example, extension method 114 may specify a default method for resolving method call 112, while a class that implements interface 106 may provide a different method implementation that also resolves method call 112. Such naming conflicts may additionally result in the inefficient resolution of method call 112 and/or the use of different method implementations at different call sites of method call 112. For example, the invocation of interface 106 by method call 112 may result in the resolution of method call 112 using the default method supplied by extension method 114 in lieu of a more specific and/or efficient method implementation provided by a class that implements interface 106.

In one or more embodiments, SDK 102 and runtime system 104 include functionality to select a method implementation that resolves method call 112 in a consistent, efficient, and/or specific manner. SDK 102 and runtime system 104 may initially attempt to resolve method call 112 by obtaining the method implementation from an inheritance hierarchy associated with method call 112. Using the inheritance hierarchy, SDK 102 and runtime system 104 may search for the method implementation within a receiver class referenced by method call 112. If the method implementation is not found in the receiver class, SDK 102 and runtime system 104 may search for the method implementation within the superclass of the receiver class and/or other superclasses associated with the receiver class until the method implementation is found and/or all classes in the inheritance hierarchy have been searched. In other words, SDK 102 and runtime system 104 may initially examine the implementation inheritance associated with the receiver class of method call 112 to attempt to resolve method call 112.

If SDK 102 and runtime system 104 cannot resolve method call 112 using the inheritance hierarchy, SDK 102 and runtime system 104 may resolve method call 112 using a virtual extension method (e.g., extension methods 114-116) that provides a default method for the method implementation. First, SDK 102 and runtime system 104 may identify interfaces (e.g., interfaces 106-108) containing the virtual extension method within software program 110. Next, SDK 102 and runtime system 104 may remove less specific interfaces (e.g., superinterfaces of interfaces containing the virtual extension method) from the identified interfaces to facilitate the selection of a default method that is specific to the method call. SDK 102 and runtime system 104 may then obtain a set of possible default methods from the remaining interfaces and select the method implementation from the possible default methods. Use of inheritance hierarchies and virtual extension methods to resolve method calls is discussed in further detail below with respect to FIG. 2.

Figure 2:
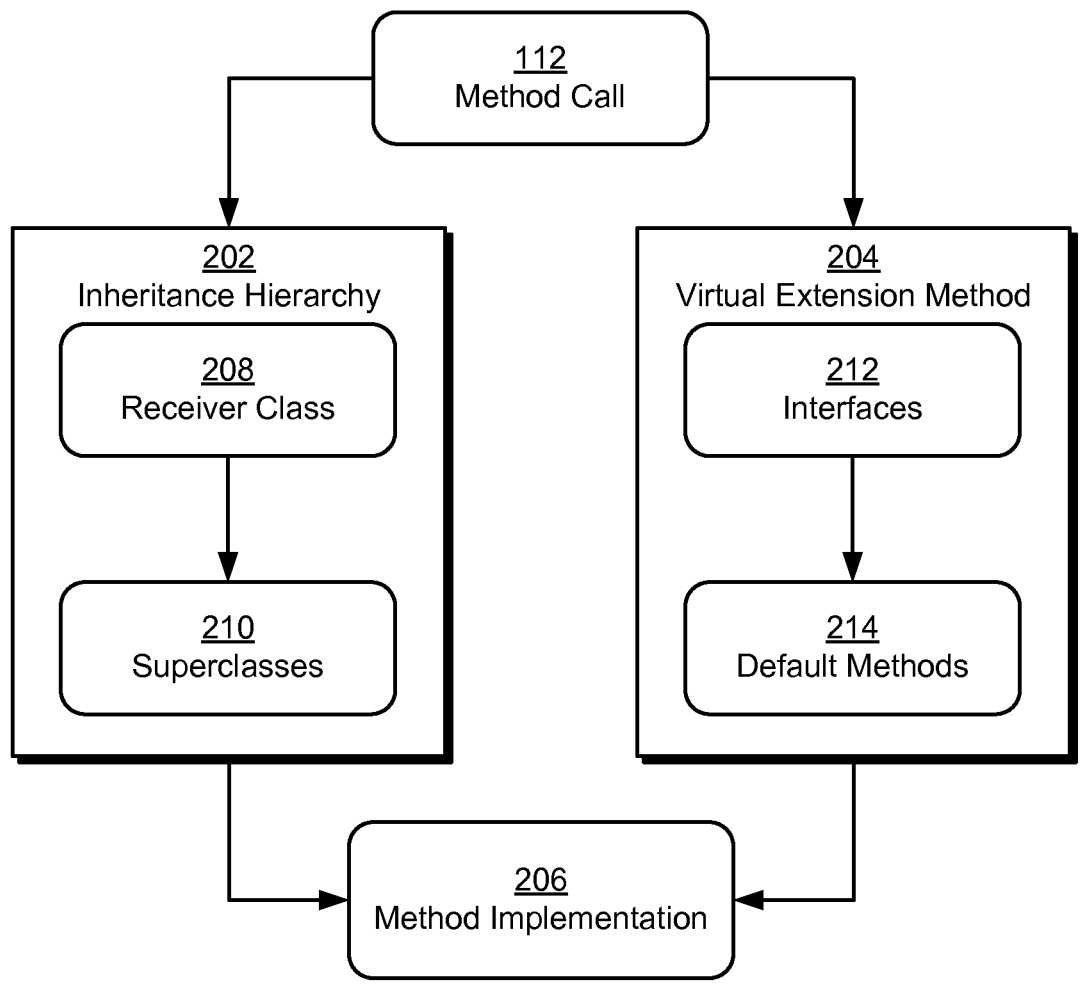
FIG. 2 shows the resolution of a method call in accordance with an embodiment.

FIG. 2 shows the resolution of method call 112 in accordance with an embodiment. As mentioned above, method call 112 may be resolved by obtaining a method implementation 206 corresponding to method call 112 from an inheritance hierarchy 202 and/or a virtual extension method 204.

As shown in FIG. 2, inheritance hierarchy 202 contains a receiver class 208, as well as a set of superclasses 210 associated with receiver class 208. Receiver class 208 may be referenced using method call 112. For example, receiver class 208 may implement an interface that is invoked by method call 112 and/or be invoked directly by method call 112. In turn, superclasses 210 may include classes that are inherited, directly and/or indirectly, by receiver class 208. For example, inheritance hierarchy 202 for a single-inheritance platform (e.g., Java) may contain four classes: receiver class 208, a first superclass inherited by receiver class 208, a second superclass inherited by the first superclass, and a third superclass inherited by the second superclass. Conversely, receiver class 208 and/or one or more superclasses 210 may inherit from multiple classes in a multiple-inheritance platform.

Because method implementations in classes (e.g., receiver class 208, superclasses 210) may utilize the internal structure (e.g., methods, data, etc.) of the classes, such method implementations may be more efficient and/or appropriate for resolving method call 112. As a result, resolution of method call 112 may begin with a search of inheritance hierarchy 202 for a matching method implementation (e.g., method implementation 206). The search may begin with receiver class 208 and end at the highest superclass associated with receiver class 208.

For example, a Java method call that invokes the "java.util.ArrayList" receiver class may be resolved by searching "java.util.ArrayList" for a corresponding method implementation. If a suitable method implementation is not found in "java.util.ArrayList," the superclass of "java.util.ArrayList," or "java.util.AbstractList," may be searched. If a matching method implementation is still not found, the superclass of "java.util.AbstractList," or "java.util.AbstractCollection," may be searched. Finally, the root of the Java class hierarchy, or "java.lang.Object," may be searched if the method implementation is not found in any of the first three classes.

If method call 112 is not resolved from a search of inheritance hierarchy 202, method call 112 may be resolved by obtaining method implementation 206 from virtual extension method 204. As discussed above, virtual extension method 204 may be included in one or more interfaces 212 to extend the functionality of interfaces 212 without requiring the creation, recompilation, and/or modification of classes that implement interfaces 212. For example, virtual extension method 204 may allow method call 112 to be resolved using interfaces 212, even if method implementations corresponding to method call 112 did not exist at the time that classes implementing interfaces 212 (e.g., receiver class 208, superclass 210) were compiled.

To resolve method call 112 using virtual extension method 204, interfaces 212 containing virtual extension method 204 may be identified, and method implementation 206 may be obtained from one or more default methods 214 specified using virtual extension method 204 in interfaces 212. For example, declarations of virtual extension method 204 in interfaces 212 may be identified by searching for the "extension" keyword followed by a first method signature that matches method call 112 in each interface associated with method call 112. A default method may then be obtained from a second method signature following a "default" keyword within each declaration of virtual extension method 204 from interfaces 212.

More specifically, after interfaces 212 are identified, less specific interfaces may be removed from interfaces 212. For example, if virtual extension method 204 is found in the "Set," "List," and "Collection" core collection interfaces of a Java program, "Collection" may be removed from the set of interfaces (e.g., interfaces 212) containing virtual extension method 204 because "Collection" is a superinterface of both "Set" and "List." Next, default methods 214 may be obtained from the remaining subset of interfaces 212, and method implementation 206 may be selected from default methods 214. Because a default method is not obtained from an interface if a subinterface of the interface also includes a default method for the same virtual extension method 204, method implementation 206 may be selected from a set of default methods 214 corresponding to the most specific method implementations that match method call 112.

For example, only one default method may be obtained from the subset of interfaces 212, either because the subset includes only one interface or because every interface in the subset specifies the same default method for virtual extension method 204 (e.g., by comparing the identities of the specified default methods and/or the identities of the interfaces specifying the default methods). Method implementation 206 may thus be obtained as the single default method specified in virtual extension method 204 from the subset of interfaces 212.

Conversely, multiple default methods 214 may be obtained from the subset of interfaces 212. Consequently, method implementation 206 may be selected from default methods 214 based on an order of implementation of the subset of interfaces 212. For example, two different default methods for resolving a method call in a Java program may be obtained from the "set" and "List" core collection interfaces. If a class implementing both interfaces (e.g., receiver class 208, superclasses 210) shows "List" in the order of implementation before "Set" (e.g., in source code for the class), the default method specified in the "List" interface may be used as method implementation 206.

Those skilled in the art will appreciate that a variety of techniques may be used to select method implementation 206 from multiple default methods 214. For example, method implementation 206 may be selected as the default method of virtual extension method 204 from an interface that includes the highest number of implementing classes (e.g., receiver class 208, superclasses 210) among the subset of interfaces 212. Alternatively, method implementation 206 may correspond to the default method of virtual extension method 204 that "shadows" other default methods from the subset of interfaces 212. In other words, selection of method implementation 206 from default methods 214 may be based on a number of factors associated with the development, compilation, and/or execution of classes (e.g., receiver class 208, superclasses 210) and/or interfaces (e.g., interfaces 212) associated with method call 112.

Those skilled in the art will also appreciate that resolution of method call 112 may occur at a number of times during the execution of a software program (e.g., software program 110 of FIG. 1) containing method call 112. However, method call 112 resolution may be performed only once per receiver class 208 to mitigate computational overhead during the execution of the software program. In addition, method call 112 resolution may be accomplished either dynamically during runtime of the software program or statically as part of the deployment and/or installation of the software program. The selected method implementation 206 may also be stored for use in resolving subsequent occurrences of method call 112 to ensure the use of the same method implementation 206 per receiver class 208 at different call sites of method call 112.

More specifically, method call 112 may be resolved during the invocation of one or more interfaces 212 associated with virtual extension method 204 by method call 112. For example, a Java method call that invokes a method defined by the "set" core collection interface may be resolved during the first invocation of "Set" by the method call within the software program. Once a method implementation is selected for resolving the method call, the method implementation and the receiver class associated with the first invocation may be referenced by a table and/or other data structure. Subsequent occurrences of the method call may then be resolved using the reference to the method implementation if receiver classes associated with the subsequent occurrences are the same as the referenced receiver class from the first invocation.

On the other hand, method call 112 may be resolved during the loading of a class implementing one or more interfaces 112 associated with virtual extension method 204. For example, during the loading of a class, methods implemented by the class may be compared with method declarations in interfaces implemented by the class. If the class is missing a method implementation for a virtual extension method (e.g., virtual extension method 204) in one or more of the implemented interfaces, an appropriate default method may be selected from the class's inheritance hierarchy and/or the virtual extension method. In addition, a virtual function table (vtable) and/or other data structure may be updated with references to the class and default method. The vtable and/or other data structure may then be used to resolve method calls associated with the class during execution of the software program.

Figure 3:
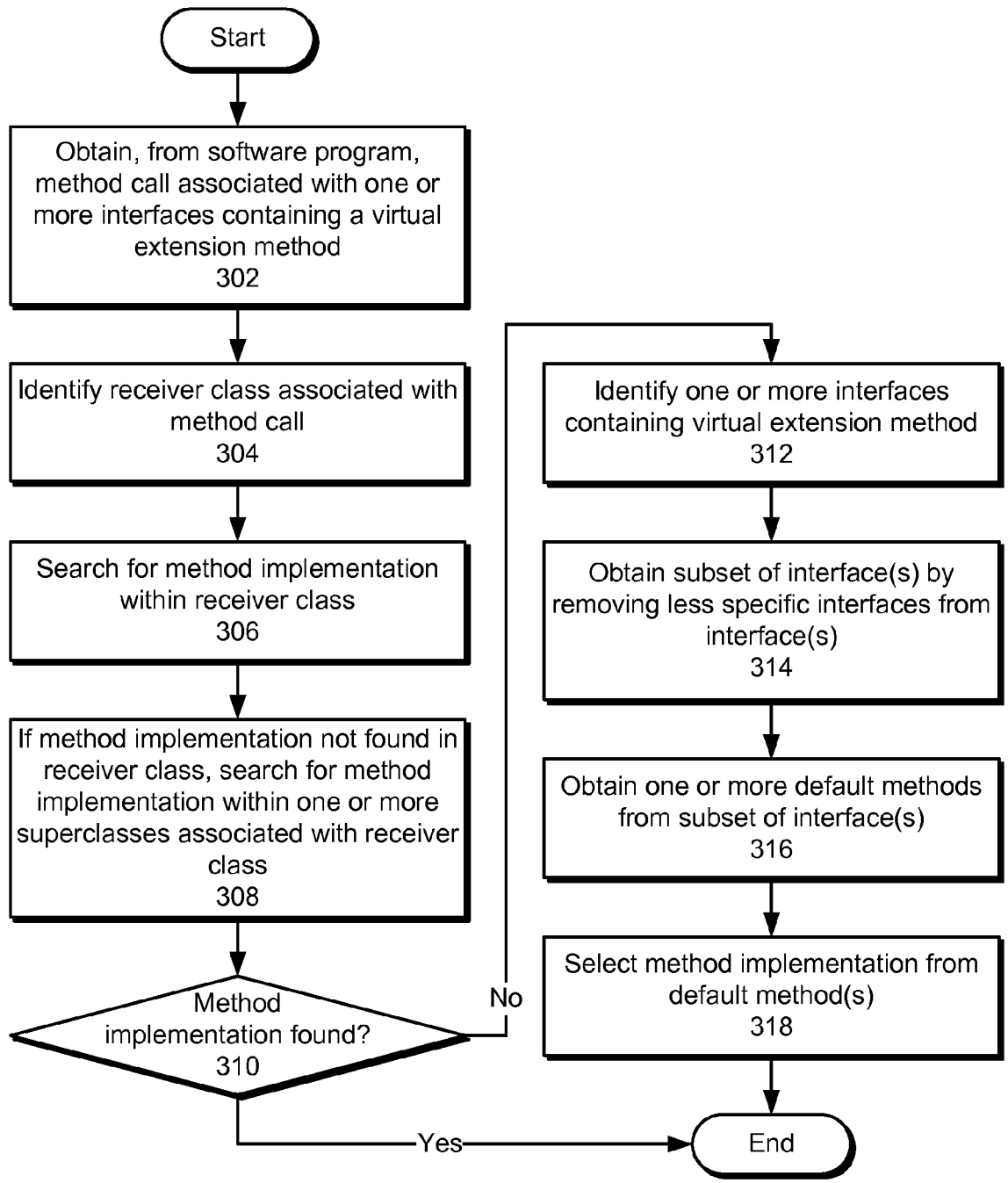
FIG. 3 shows a flowchart illustrating the process of facilitating the development and execution of a software program in accordance with an embodiment.

FIG. 3 shows a flowchart illustrating the process of facilitating the development and execution of a software program in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a method call associated with one or more interfaces containing a virtual extension method is obtained from the software program (operation 302). The method call may be resolved using an inheritance hierarchy associated with the method call and/or a virtual extension method in the interface (s).

In particular, an initial attempt to resolve the method call may utilize the inheritance hierarchy. First, a receiver class associated with the method call is identified (operation 304). For example, the receiver class may be invoked by the method call and/or implement an interface invoked by the method call. Next, a method implementation corresponding to the method call is searched for within the receiver class (operation 306). If the method implementation is not found in the receiver class, the method implementation is searched for within one or more superclasses associated with the receiver class (operation 308). For example, the search for the method implementation may begin with the receiver class, move on to the superclass of the receiver class, then on to the superclass of the superclass, and so on until the method implementation is found (operation 310) and/or the entire inheritance hierarchy of the receiver class has been searched. If the method implementation is found within the inheritance hierarchy, the method call is resolved using the method implementation.

If the method implementation cannot be found within the inheritance hierarchy, the method call may be resolved using the virtual extension method. More specifically, the interface (s) containing the virtual extension method are identified (operation 312), and a subset of the interface(s) is obtained by removing less specific interfaces from the interface(s) (operation 314). One or more default methods are obtained from the subset of the interface(s) (operation 316), and the method implementation is selected from the default method(s) (operation 318). For example, the method implementation may be obtained as the single default method specified in the subset of interface(s). Alternatively, the method implementation may be selected from multiple default methods based on an order of implementation of the subset of the interfaces from which the default methods were obtained, the number of implementing classes for each of the interfaces, the shadowing of default methods by one another, and/or another technique for prioritizing the default methods.

Figure 4:
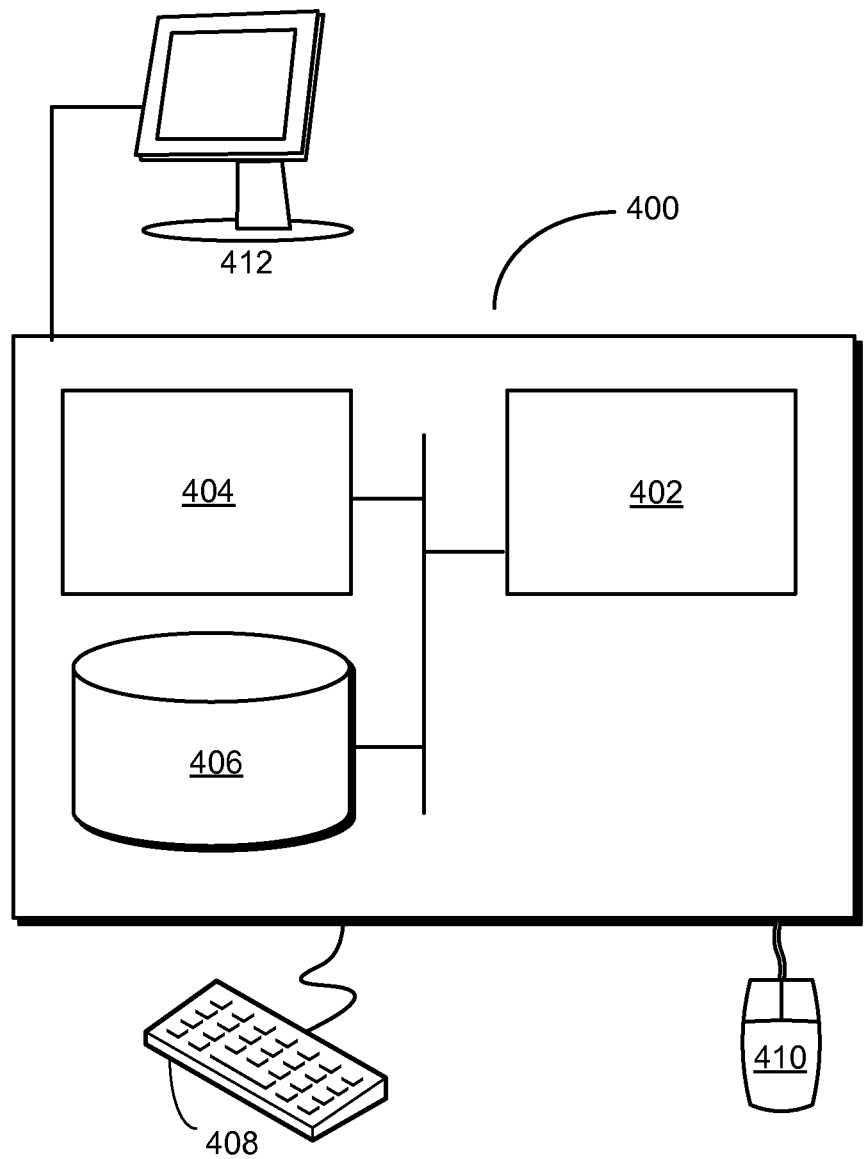
FIG. 4 shows a computer system in accordance with an embodiment.

FIG. 4 shows a computer system 400 in accordance with an embodiment. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating the development and execution of a software program. The system may include an SDK and a runtime system. The SDK and runtime system may obtain, from the software program, a method call associated with one or more interfaces containing a virtual extension method. The SDK and runtime system may also resolve the method call by obtaining a method implementation corresponding to the method call from at least one of an inheritance hierarchy associated with the method call and the virtual extension method.

In addition, one or more components of computer system 400 may be remotely located and connected to the other components over a network. Portions of the present embodiments (e.g., SDK, runtime system, etc.) may also be located on different nodes of a distributed system that implements the embodiments. For example, the present embodiments may be implemented using a cloud computing system that remotely manages the development, compilation, and execution of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method, comprising:
accessing, from a software program, a method call associated with an inheritance hierarchy and a plurality of extension methods, wherein:
an extension method facilitates the addition of a new method to an existing interface without requiring existing classes that implement the existing interface to implement the new method; and
each of the plurality of extension methods comprises a method signature that corresponds to the method call;
attempting to resolve the method call by searching for a method implementation that corresponds to the method call in the inheritance hierarchy, wherein doing so comprises:
searching for the method implementation within a receiver class that is associated with the method call;
responsive to not finding the method implementation in the receiver class, searching for the method implementation within one or more superclasses associated with the receiver class; and
responsive to not finding the method implementation in the inheritance hierarchy, resolving the method call by:
removing a first interface from a plurality of interfaces to obtain one or more remaining interfaces, wherein each one of the plurality of interfaces comprises one of the plurality of extension methods and wherein a subinterface of the first interface comprises one of the plurality of extension methods; and
selecting a first extension method of a second interface to provide the method implementation, wherein the second interface has the highest number of implementing classes in the one or more remaining interfaces.

2. The computer-implemented method of claim 1, wherein the method call is resolved during at least one of:
invocation of the one or more interfaces; and
loading of a class implementing the one or more interfaces.

3. The computer-implemented method of claim 1, wherein source code for at least one of the plurality of extension methods is included within the declaration of an interface that comprises the extension method.

4. The computer-implemented method of claim 1, further comprising:
referencing, within a table, the receiver class and the method implementation provided by the first extension method; and
using the reference to resolve a subsequent occurrence of the method call if a second receiver class associated with the subsequent occurrence is the same as the receiver class.

5. A non-transitory computer-readable storage medium storing instructions that when executed by a computer cause the computer to perform a method, the method comprising:
accessing, from a software program, a method call associated with an inheritance hierarchy and a plurality of extension methods, wherein:
an extension method facilitates the addition of a new method to an existing interface without requiring existing classes that implement the existing interface to implement the new method; and
each of the plurality of extension methods comprises a method signature that corresponds to the method call;
attempting to resolve the method call by searching for a method implementation that corresponds to the method call in the inheritance hierarchy, wherein doing so comprises:
searching for the method implementation within a receiver class that is associated with the method call; and
responsive to not finding the method implementation in the receiver class, searching for the method implementation within one or more superclasses associated with the receiver class; and
responsive to not finding the method implementation in the inheritance hierarchy, resolving the method call by:
removing a first interface from a plurality of interfaces to obtain one or more remaining interfaces, wherein each one of the plurality of interfaces comprises one of the plurality of extension methods and wherein a subinterface of the first interface comprises one of the plurality of extension methods; and
selecting a first extension method of a second interface to provide the method implementation, wherein the second interface has the highest number of implementing classes in the one or more remaining interfaces.

6. The non-transitory computer-readable storage medium of claim 5, wherein the method call is resolved during at least one of:
invocation of the one or more interfaces; and
loading of a class implementing the one or more interfaces.

7. The non-transitory computer-readable storage medium of claim 5, wherein source code for at least one of the plurality of extension methods is included within the declaration of an interface that comprises the extension method.

8. The non-transitory computer-readable storage medium of claim 5, further comprising:
referencing, within a table, the receiver class and the method implementation provided by the first extension method; and using the reference to resolve a subsequent occurrence of the method call if a second receiver class associated with the subsequent occurrence is the same as the receiver class.

9. A computer-implemented method, comprising:
accessing, from a software program, a method call associated with an inheritance hierarchy and a plurality of extension methods, wherein:
an extension method facilitates the addition of a new method to an existing interface without requiring existing classes that implement the existing interface to implement the new method; and
each of the plurality of extension methods comprises a method signature that corresponds to the method call;
attempting to resolve the method call by searching for a method implementation that corresponds to the method call in the inheritance hierarchy, wherein doing so comprises:
searching for the method implementation within a receiver class that is associated with the method call; and
responsive to not finding the method implementation in the receiver class, searching for the method implementation within one or more superclasses associated with the receiver class; and
responsive to not finding the method implementation in the inheritance hierarchy, resolving the method call by:
removing a first interface from a plurality of interfaces to obtain one or more remaining interfaces, wherein each one of the plurality of interfaces comprises one of the plurality of extension methods and wherein a subinterface of the first interface comprises one of the plurality of extension methods; and
selecting, from one or more remaining extension methods of the one or more remaining interfaces, a first extension method based on an order of implementation of the one or more remaining interfaces in a source code of a class.

10. The computer-implemented method of claim 9, wherein the method call is resolved during at least one of:
invocation of the one or more interfaces; and
loading of a class implementing the one or more interfaces.

11. The computer-implemented method of claim 9, wherein source code for at least one of the plurality of extension methods is included within the declaration of an interface that comprises the extension method.

12. The computer-implemented method of claim 9, further comprising:
referencing, within a table, the receiver class and the method implementation provided by the first extension method; and
using the reference to resolve a subsequent occurrence of the method call if a second receiver class associated with the subsequent occurrence is the same as the receiver class.

13. A non-transitory computer-readable storage medium storing instructions that when executed by a computer cause the computer to perform a method, the method comprising:
accessing, from a software program, a method call associated with an inheritance hierarchy and a plurality of extension methods, wherein:
an extension method facilitates the addition of a new method to an existing interface without requiring existing classes that implement the existing interface to implement the new method; and
each of the plurality of extension methods comprises a method signature that corresponds to the method call;
attempting to resolve the method call by searching for a method implementation that corresponds to the method call in the inheritance hierarchy, wherein doing so comprises:
searching for the method implementation within a receiver class that is associated with the method call; and
responsive to not finding the method implementation in the receiver class, searching for the method implementation within one or more superclasses associated with the receiver class; and
responsive to not finding the method implementation in the inheritance hierarchy, resolving the method call by:
removing a first interface from a plurality of interfaces to obtain one or more remaining interfaces, wherein each one of the plurality of interfaces comprises one of the plurality of extension methods and wherein a subinterface of the first interface comprises one of the plurality of extension methods; and
selecting, from one or more remaining extension methods of the one or more remaining interfaces, a first extension method based on an order of implementation of the one or more remaining interfaces in a source code of a class.

14. The non-transitory computer-readable storage medium of claim 13, wherein the method call is resolved during at least one of:
invocation of the one or more interfaces; and
loading of a class implementing the one or more interfaces.

15. The non-transitory computer-readable storage medium of claim 13, wherein source code for at least one of the plurality of extension methods is included within the declaration of an interface that comprises the extension method.

16. The non-transitory computer-readable storage medium of claim 13, further comprising:
referencing, within a table, the receiver class and the method implementation provided by the first extension method; and
using the reference to resolve a subsequent occurrence of the method call if a second receiver class associated with the subsequent occurrence is the same as the receiver class.

17. A computer-implemented method, comprising:
accessing, from a software program, a method call associated with an inheritance hierarchy and a plurality of extension methods, wherein:
an extension method facilitates the addition of a new method to an existing interface without requiring existing classes that implement the existing interface to implement the new method; and
each of the plurality of extension methods comprises a method signature that corresponds to the method call;
attempting to resolve the method call by searching for a method implementation that corresponds to the method call in the inheritance hierarchy, wherein doing so comprises:
searching for the method implementation within a receiver class that is associated with the method call; and
responsive to not finding the method implementation in the receiver class, searching for the method implementation within one or more superclasses associated with the receiver class; and
responsive to not finding the method implementation in the inheritance hierarchy, resolving the method call by:
removing a first interface from a plurality of interfaces to obtain one or more remaining interfaces, wherein each one of the plurality of interfaces comprises one of the plurality of extension methods and wherein a subinterface of the first interface comprises one of the plurality of extension methods; and selecting, from one or more remaining extension methods of the one or more remaining interfaces, a first extension method that refers to a static method that shadows one or more other static methods of the one or more remaining interfaces, wherein the one or more other static methods are default methods.

18. The computer-implemented method of claim 17, wherein the method call is resolved during at least one of:

invocation of the one or more interfaces; and loading of a class implementing the one or more interfaces.

19. The computer-implemented method of claim 17, wherein source code for at least one of the plurality of extension methods is included within the declaration of an interface that comprises the extension method.

20. The computer-implemented method of claim 17, further comprising:

referencing, within a table, the receiver class and the method implementation provided by the first extension method; and using the reference to resolve a subsequent occurrence of the method call if a second receiver class associated with the subsequent occurrence is the same as the receiver class.

21. A non-transitory computer-readable storage medium storing instructions that when executed by a computer cause the computer to perform a method, the method comprising:

accessing, from a software program, a method call associated with an inheritance hierarchy and a plurality of extension methods, wherein:

an extension method facilitates the addition of a new method to an existing interface without requiring existing classes that implement the existing interface to implement the new method; and each of the plurality of extension methods comprises a method signature that corresponds to the method call;

attempting to resolve the method call by searching for a method implementation that corresponds to the method call in the inheritance hierarchy, wherein doing so comprises:

searching for the method implementation within a receiver class that is associated with the method call; and responsive to not finding the method implementation in the receiver class, searching for the method implementation within one or more superclasses associated with the receiver class; and responsive to not finding the method implementation in the inheritance hierarchy, resolving the method call by:

removing a first interface from a plurality of interfaces to obtain one or more remaining interfaces, wherein each one of the plurality of interfaces comprises one of the plurality of extension methods and wherein a subinterface of the first interface comprises one of the plurality of extension methods; and selecting, from one or more remaining extension methods of the one or more remaining interfaces, a first extension method that refers to a static method that shadows one or more other static methods of the one or more remaining interfaces, wherein the one or more other static methods are default methods.

22. The non-transitory computer-readable storage medium of claim 21, wherein the method call is resolved during at least one of:

invocation of the one or more interfaces; and loading of a class implementing the one or more interfaces.

23. The non-transitory computer-readable storage medium of claim 21, wherein source code for at least one of the plurality of extension methods is included within the declaration of an interface that comprises the extension method.

24. The non-transitory computer-readable storage medium of claim 21, further comprising:

referencing, within a table, the receiver class and the method implementation provided by the first extension method; and using the reference to resolve a subsequent occurrence of the method call if a second receiver class associated with the subsequent occurrence is the same as the receiver class.

* * * * *

UNITED STATES PATENT AND TRADEMARK OFFICE
CERTIFICATE OF CORRECTION

PATENT NO. : 9,170,825 B2
APPLICATION NO. : 13/092002
DATED : October 27, 2015
INVENTOR(S) : Goetz et al.

Page 1 of 1

It is certified that error appears in the above-identified patent and that said Letters Patent is hereby corrected as shown below:

In the Specification

In column 7, line 47, delete ""set"" and insert -- "Set" --, therefor.

Signed and Sealed this
Twenty-eighth Day of June, 2016

Michelle K. Lee
*Director of the United States Patent and Trademark Office*